Feb. 2, 1932. J. J. EDWARDS 1,843,150
SPARE TIRE LOCK
Filed June 11, 1928
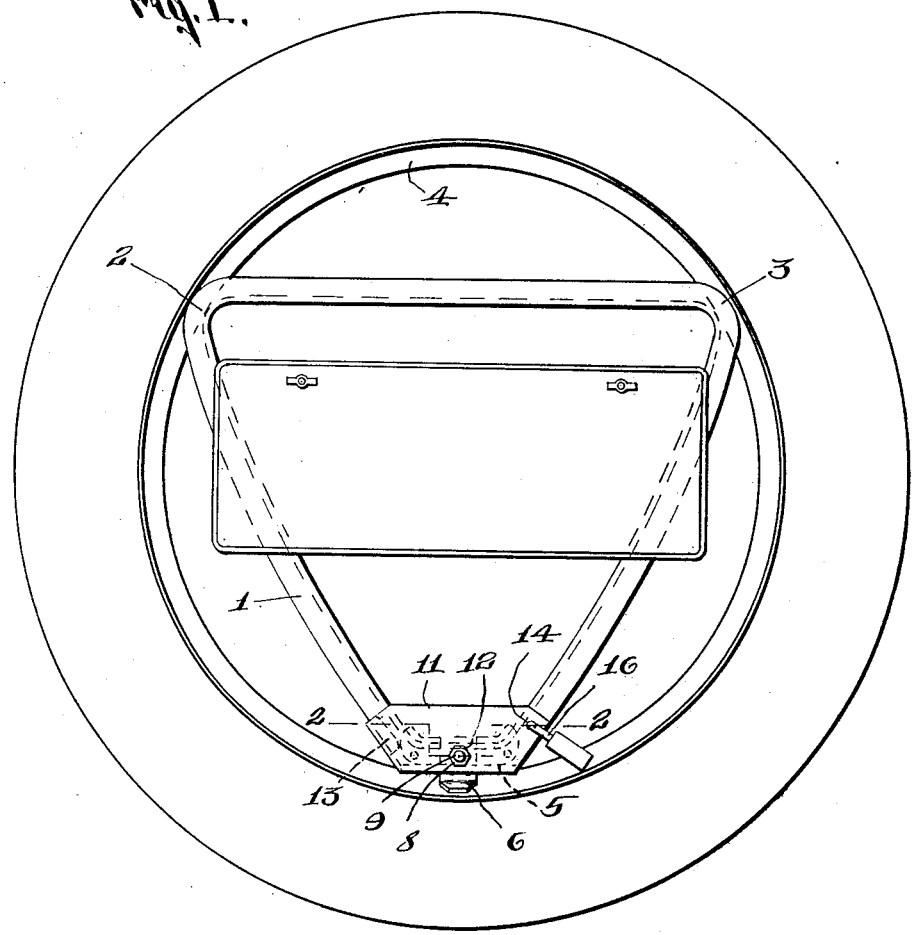
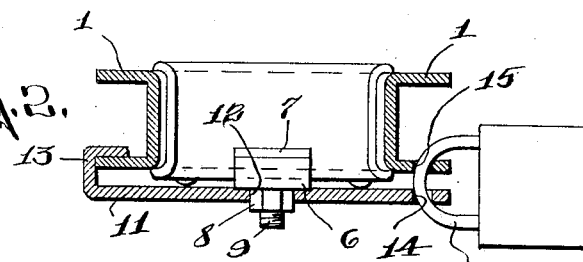
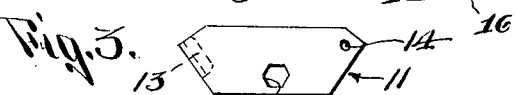
INVENTOR.
Joseph J. Edwards.
BY
Parsons & Bodell
ATTORNEYS.

Patented Feb. 2, 1932

1,843,150

UNITED STATES PATENT OFFICE

JOSEPH J. EDWARDS, OF SYRACUSE, NEW YORK, ASSIGNOR TO THE O. M. EDWARDS COMPANY INC., OF SYRACUSE, NEW YORK, A CORPORATION OF NEW YORK

SPARE TIRE LOCK

Application filed June 11, 1928. Serial No. 284,301.

This invention relates to means for locking spare rims and tires on tire carriers and has for its object, a particularly simple and efficient device for locking spare tires on the tire carriers of the type embodied in the 1928 models for Chevrolet cars, which device is particularly simple and economical in construction, readily applicable to the tire carrier, and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is an elevation of a tire carrier embodying my invention, the spare tire and frame being shown as mounted thereon.

Figure 2 is a cross sectional view on line 2—2, Figure 1.

Figures 3 and 4 are respectively an elevation and an edge view looking downwardly of the device.

The tire carrier here shown comprises a triangular frame 1 of a channel iron with a channel facing outwardly, the channel at two corners, as the two upper corners 2, 3 being designed to receive the tire rim 4 with the tire thereon and prevent lateral displacement of the contiguous portions of the rim off the frame and the outer side wall of the channel at the third corner 5 being removed to permit lateral displacement of the contiguous portion of the rim in order that the rim and tire may be lifted off the other two corners.

In this type of carrier, the rim is normally prevented from being moved laterally or rearwardly off the lower corner by a lug 6 bearing on the tire rim at its lower end and against the frame or a projection 7 therefrom at its upper end and a nut 8 screwing on a stud 9 projecting from the frame through the lug.

To remove the tire, the nut 8 is unscrewed, the lug 6 removed and the tire and rim then removed by pulling outwardly on the lower portion of the tire and rim and then lifting the tire and rim upwardly off the frame.

The construction thus far described is old in so far as this invention is concerned.

This invention comprises a device for locking the tire and rim on the tire carrier by preventing turning of the nut. The device comprises a sheet metal plate 11 in the form of a web having means at one end for attachment to the rim or the channel thereof, an opening 12 usually hexagonal for fitting the hexagonal nut 8 and any secret means as key operated means for locking the plate to the frame at a point remote from the former means. The plate 11 is bent up of sheet metal and the means for attaching it to the frame is a flange 13 at one end of the plate, this flange being angular or hook shaped in order to hook over one of the walls of the carrier frame as shown in Figure 2.

The plate is formed with an opening 14 at its end remote from the flange 13, this opening being designed to come into alinement with an opening 15 in the carrier. The alined openings are designed to receive the bolt or other locking member of a secret lock device as the hasp 16 of a padlock.

Obviously, when the plate is locked in position, the nut 8 can not be turned and hence the tire and rim can not be removed from the carrier. Also, the device operates to lock a tire on the carrier if the lug and nut are omitted, as the plate will then act as a lug to prevent the lateral displacement of the lower portion of the tire off the tire carrier. However, as each carrier is provided with a stud and a nut, this locking means preferably includes means for locking the nut.

This locking device consists of a single plate and hence is easily and economically manufactured and readily applied and removed from the tire carrier.

What I claim is:

1. The combination with a spare tire carrier comprising a frame having channelled portions for interlocking with the tire rim at a plurality of points to prevent lateral displacement of the tire and a corner portion with one of the walls of the channel removed, a detachable plate which normally serves as one side wall of the corner portion to prevent lateral movement of the adjacent portion of the rim and the frame, a threaded stud on the frame projecting through said plate, a removable lug mounted on the stud to press against the frame and the rim, and a nut threaded on the stud against the lug; of a detachable locking plate extending across corner portion and having a hook shaped margin at one end for interlocking with the channel portion of the frame, an opening between its ends for substantially fitting the nut, and means for locking the other end of the plate to the frame.

2. The combination with a spare tire carrier comprising a frame having channelled portions for interlocking with the tire rim at a plurality of points to prevent lateral displacement of the tire and a corner portion with one of the walls of the channel removed, a detachable locking plate extending across said corner portion and having a hook shaped margin at one end for interlocking with the channel portion of the frame, and means for locking the other end of the plate to the frame.

In testimony whereof, I have hereunto signed my name, at Syracuse, in the county of Onondaga, and in the State of New York, this seventh day of June, 1928.

JOSEPH J. EDWARDS.